2,955,072
CHLORONITRONAPHTHALENES AS FUNGICIDES

Rex D. Closson, Northville, Mich., and Walter T. Smith, Jr., Lexington, Ky., assignors, by mesne assignments, to Pittsburgh Coke and Chemical Company, a corporation of Pennsylvania No Drawing. Filed Dec. 23, 1954, Ser. No. 477,381

5 Claims. (Cl. 167—32)

This invention relates to novel fungicidal compositions and more particularly to new and potent fungicidal compositions in which the principal active ingredient is a halonitronaphthalene of the type described below.

An object of this invention is to provide new compositions of matter. Another object of this invention is to provide new fungicidal compositions. Still another object is to provide a new and improved means of combating fungi.

The above objects are accomplished by providing fungicidal compositions which comprise conditioning agents plus halonitronaphthalenes of the formula

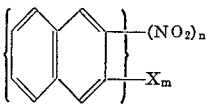

wherein $n$ is one of the integers 1 and 2, $m$ is one of the integers 1 and 2, the total of $n$ and $m$ is not over three and $n$ is preferably 2, and X is halogen of atomic number 17–35. Such halonitronaphthalenes have now been discovered to be outstanding in their fungicidal activity, and, since they are relatively cheap and readily available, are commercially interesting. 2,4-dinitro-1-chloronaphthalene is one of the outstanding fungicides of this invention, as will be seen from the data presented.

There are a number of ways to prepare halonitronaphthalenes. These include nitration of halogenated naphthalenes, halogenation of nitrated naphthalenes, replacement of hydroxyl groups in nitronaphthalenes by halogen, etc. The reactivity of substituted naphthalenes and the directive influence of groups present in the naphthalene nucleus vary with the nature of the group. Furthermore, in many cases naphthalene derivatives are so reactive that it is almost impossible to carry out a mono-substitution reaction, with the result that the product obtained is usually a mixture and frequently a mixture of di- and tri-substitution products. This is true of many of the products of this invention. For this reason, in some cases we are unable to designate our products by specifying the positions of all substituents but instead must describe them in terms of physical properties and method of manufacture. Typical examples of methods of manufacture of fungicides of our invention are illustrated below.

EXAMPLE I

*Mononitro-1-chloronaphthalene*

A mixture of 100 parts of α-chloronaphthalene and 142 parts of nitric acid was stirred vigorously. The slight heat of reaction which developed dissipated in a few minutes. Stirring was continued at room temperature for 3 hours. The oily mass was then washed repeatedly with water. It was then crystallized from 650 parts of isopropyl alcohol to give 43 parts of mono-nitro-1-chloronaphthalene, M.P. 62–67° C. Recrystallization from 240 parts of isopropyl alcohol raised the M.P. to 70–74° C. One more recrystallization from 80 parts of isopropyl alcohol gave 25 parts, M.P. 72–75° C.

*Analysis.*—Calculated for $C_{10}H_6ClNO_2$, 6.8 percent N. Found, 6.96 percent N.

EXAMPLE II

*Nitrodichloronaphthalene*

To 890 parts of well stirred concentrated $HNO_3$ was added 50 parts of molten dichloronaphthalene. The mixture was stirred at room temperature for 2 hours. Since the solid dichloronaphthalene tended to clump together, the mixture was then heated to about 45° C., at which point the dichloronaphthalene liquefied. Heating was stopped at this point, but the temperature rose to 60° C. and then gradually returned to room temperature. The solid nitrodichloronaphthalene which formed was washed with water to give 53 parts, M.P. 65–75° C.

*Analysis.*—Calculated for $C_{10}H_5Cl_2NO_2$, 29.3 percent N. Found, 28.9 percent N.

EXAMPLE III

*2,4-dinitro-1-chloronaphthalene*

A mixture of 96 parts of 2,4-dinitro-1-naphthol, 120 parts of N,N-diethylaniline, and 76 parts of p-toluenesulfonylchloride was heated at 100° C. for 4 hours. The dark solution was allowed to cool, then mixed with 300 parts of 5 percent hydrochloric acid and filtered. The precipitate was washed with an additional 600 parts of 5 percent hydrochloric acid and then with 400 parts of 3 percent ammonium hydroxide and 400 parts of water. The product thus obtained weighed 14 parts, M.P. 137–141° C. It was taken up in 240 parts of boiling benzene, and the insoluble material was removed by filtration. The filtrate was cooled and filtered to give 72 parts (71 percent yield), M.P. 142–144° C. (corrected).

EXAMPLE IV

*Nitrodibromonaphthalene*

To 142 parts of $HNO_3$ at 70° C. was added 20 parts of mixed dibromonaphthalene in small portions, keeping the temperature at about 70° C. The mixture was allowed to stand overnight, and the supernatant liquid was decanted. The gummy solid was washed several times with water and then recrystallized from 200 parts of isopropyl alcohol to give 14 parts of nitrodibromonaphthalene, M.P. 60–105° C. This product contained 5.26 percent nitrogen which corresponds to a mixture of 69 percent mononitro- and 31 percent dinitrodibromonaphthalene.

The synthesis of other halonitronaphthalenes of this invention can be conducted along similar lines.

Other typical halonitronaphthalenes of this invention include 2,5 - dinitro - 1 - chloronaphthalene, 2,6-dinitro-1-chloronaphthalene, 2,7-dinitro-1-chloronaphthalene, 2,8-dinitro-1-chloronaphthalene, 2,4-dinitro - 1 - bromonaphthalene, 2,5-dinitro-1-bromonaphthalene, 2,8-dinitro-1-bromonaphthalene, 1,3-dinitro-2-bromonaphthalene, 2,5-dibromo-1-nitronaphthalene, 2,4-dichloro - 1 - nitronaphthalene, and the like.

For maximum effectiveness the active ingredient of the present invention is admixed in fungicidally effective amount with a conditioning agent of the type commonly referred to as a pest control adjuvant or modifier. Such adjuvants have been referred to variously in the trade by names such as conditioning agent, dispersing agent, surface-active agent, and surface-active dispersing agent. In order to provide formulations particularly adapted for ready and efficient application to pests using conventional equipment, such formulations comprise those of both the liquid and solid types. Such adjuvants have the effect of requiring only minute quantities of the above defined compound in certain formulations to obtain effective protection. A further advantage of so extending this compound is to permit field application by methods readily employed and still obtain effectively complete coverage of the material being protected.

The formulations of this invention, therefore, comprise the hereinabove defined fungicidally active ingredient and a suitable material as a dispersant or conditioning agent therefor. It is not intended that this invention be limited to any specific proportions of active ingredient and conditioning agent. The important feature of the invention is to provide a conditioning agent such that upon the preparation of a formulation of such concentration as appropriate for application, the conditioning agent will be present to provide the proper type of contact with the material being protected. Thus, in one embodiment the conditioning agent can comprise a surface-active agent such as a detergent, a soap, or other wetting agent. Such a formulation then comprises the active ingredient in combination with a minor proportion of the surface-active agent. Such a formulation is of practical merit because of its concentrated form and ease of transportation, storage, and the like. Such a formulation also lends itself directly to further dilution with the carrier without resorting to complicated mixing and blending procedures. Thus, such a formulation can be directly suspended in water or can be further diluted with an oil which upon mixing with water thereby forms an oil-in-water emulsion containing the active ingredient. One further example of the utility of such a formulation comprises the preparation by further dilution with a solid carrier of a wettable powder which upon admixture with water prior to application forms a dispersion of the active ingredient and the solid carrier in water.

It is also intended that the term "conditioning agent" include solid carriers of the type of talc, pyrophyllite, Attaclay, a mixture of oxides of silicon, iron, aluminum, magnesium and calcium, kieselguhr, chalk, diatomaceous earth, and the like; and various mineral powders, such as calcium carbonate and the like, which act as a dispersant, as a carrier, and in some instances perform the function of a surface-active agent.

The conditioning agent may also be an industrial commodity, such as paint, raw polymer, finished plastic, and the like. In the case of such industrial materials the conditioning agent can act as a diluent, dispersant, wetting agent, and extender for the active ingredient, thus enhancing its fungicidal action.

One method of applying these fungicides is in the form of a water suspension. To obtain a fungicidally active aqueous suspension, we preferably employ a surface-active agent in sufficient amount to disperse and suspend the fungicidal agent. Examples of such surface-active agents which can be employed in forming dispersions include salts of the alkyl and alkylaryl sulfonates, such as the sodium salt of sulfonated ethyl oleate, the sodium salt of sulfonated oxidized petroleum oils, dioctyl sodium sulfosuccinate, sodium decylbenzene sulfonate, potassium dodecylbenzene sulfonate, and the sodium salt of sulfonated ethyl oleyl amide; alkyl salts, such as sodium lauryl sulfate, sodium oleyl sulfate, ammonium ricinoleyl sulfate, and the like; alkylaryl polyether alcohols, such as alkyl, phenoxy, polyethoxyethanol (alkyl can be methyl to $C_{20}$ or higher), the condensate of ethylene oxide and alkylated cresol, polyoxy ethylene thioether, and the like; fatty acid esters of polyhydric alcohols, such as mannitan monolaurate, sorbitan monooleate, and the like; and the ethylene oxide addition products of such esters, such as the polyoxyethylene derivative of sorbitan monooleate, etc. Still other surface-active agents can be employed, the above merely showing a representative list of the more common materials.

In the examples which follow, all parts are parts by weight.

EXAMPLE V

A formulation of 1-bromo-5-nitronaphthalene is prepared by adding with vigorous agitation 10 parts of this material to 1000 parts of water containing one part of ammonium ricinoleyl sulfate. This concentrated dispersion is further diluted 1000 times by the addition of water to obtain a formulation of suitable concentration for application. Thus, the resulting dispersion contains 10 p.p.m. of our fungicide in the water dispersion.

A preferred formulation of the halonitronaphthalenes comprises a wettable powder. In preparing wettable powders several formulation procedures are possible. Thus, it is one intention of this invention to provide compositions comprising the active ingredient defined herein in combination with a minor amount of a surface-active agent. Such surface-active agent can be chosen, for example, from among those mentioned above in connection with aqueous dispersions. Still other surface-active agents can be employed, the above merely showing a representative list of the more common materials. Such formulations can be readily admixed with a solid carrier. Formulations thus formed then comprise the active ingredient of this invention, a surface-active agent, and the fungicidally inert carrier. Among the inert carriers which can be employed in thus preparing wettable powders are, for example, soybean flour, tobacco flour, walnut shell flour, wood flour, sulfur, tripolite, diatomite, calcium lime, magnesium lime, calcite, dalomite, gypsum, mica, talc, pyrophyllite, montmorillonite, kaolinite, attapulgite, apatite, and pumice. In preparing such concentrated wettable powders it is preferred to employ between about 0.1 and 5 percent of the surface-active agent based upon the amount of active ingredient, and up to 85 percent of the inert carrier based upon the total amount of the formulation. Such formulations provide the advantage of permitting storage and transportation of the fungicide and permit further dilution by simple admixture with water at the time of application. Thus, within the scope of this invention is also contemplated finished formulations for direct application comprising the halonitronaphthalenes, surface-active agents as illustrated above, and inert solid carriers as likewise illustrated above, all suspended in water. Such finished formulations, depending upon the application in mind, can include between about 0.1 to 10,000 p.p.m. of active ingredient. A preferred range for agricultural application is between 0.1 and 2,000 p.p.m. Typical formulations of such wettable powders of this invention are illustrated in the following examples, wherein the active ingredient of this invention is employed as the fungicide.

EXAMPLE VI

A mixture of 100 parts of 2,4-dinitro-1-chloronaphthalene, 1000 parts of finely divided calcium carbonate, 0.1 part of dioctyl sodium sulfosuccinate, and 0.1 part of sodium decylbenzene sulfonate is intimately co-mingled in an L-shaped blender. The 10 percent wettable powder thus prepared produces a satisfactory water suspension when 11 parts are stirred into sufficient water to produce a suspension containing 100 p.p.m. active ingredient.

In addition to the above described methods of wet application of the active ingredient of this invention, compositions can be prepared in which the material is extended in talc, clay, or other solid diluents. Such carriers perform the conditioning agent function as contact agents. Further specific examples of such typical fungicidally inert solid carriers which can be employed as diluents in the dust formulations include fuller's earth, calcium carbonate, pyrophyllite, Attaclay, a mixture of oxides of silicon, iron, aluminum, magnesium and calcium, and the Filtrols, acid activated montmorillonite being the oxides of magnesium, calcium, aluminum and silicon.

EXAMPLE VII

A dust formulation of one of our fungicides is prepared as follows: One part of 2-chloro-1-nitronaphthalene is placed in a ball mill with 100 parts of fuller's earth. This mixture is milled for a period of one hour and screened to collect a fraction passing a 100-mesh sieve. This one percent by weight formulation can be applied directly or further diluted. A further dilution is made by repeating the above procedure with an additional 100 parts of fuller's earth per part of the first-obtained mixture. For certain applications it is preferred to employ the fungicide in the form of colloidal dispersions in oil-water media. In the preparation of such dispersions a mixture of oil, water, halonitronaphthalene, and surface-active agent is intimately co-mingled as in a colloid mill to obtain a highly effective mixture. Typical examples of the oil ingredient of such formulations include hydrocarbons, such as kerosene, benzene, toluene, or naphtha; higher alcohols, such as butanol, oleyl alcohol, or ethers and esters thereof; and chlorinated solvents, such as perchloroethylene and trichloroethylene.

EXAMPLE VIII

A colloidal formulation is prepared by passing a mixture of 10 parts of 2,4-dinitro-1-bromonaphthalene, 100 parts of kerosene, 1000 parts of water, and 1 part of mannitan monooleate through a colloid mill until homogenization of the oil and water is achieved. This formulation has potential fungicidal properties.

In addition, we have found that we can incorporate an adherent or sticking agent, such as vegetable oils, naturally occurring gums, and other adhesives, in our active ingredient formulations. Likewise, we can employ humectants in our formulations. Furthermore, these formulations can be employed in admixture with other fungicidal materials or other biocides, such as insecticides, larvicides, bactericides, vermicides, miticides, or with other materials which it is desired to apply along with our fungicide, including mixtures of our active ingredient.

The effectiveness of our compounds against fungi is demonstrated by the following tests in which they were applied to the habitat of the fungi.

*Slide germination test.*—By the slide germination test the concentration of the chemical required to inhibit germination of spores from 7- to 10-day old cultures of *Alternaria oleracea* and *Sclerotinia fructicola* is determined. Concentrations of test chemicals used in the primary screen are 1000, 100, 10, and 1.0 p.p.m. The specified concentrations of test chemical are prepared in aqueous suspensions by a series of test tube dilutions. Following the initial dilutions, four volumes of test suspension are diluted with one volume of spore stimulant and spore suspension. The spore stimulant is added to insure a high and relatively stable percentage of germination in the checks. Drops of the test specimen mixture, and an untreated control are pipetted onto glass slides. The glass slides are placed in moist chambers for 20 hours incubation at 22° C. Germination counts are made by counting 100 potentially viable spores, those spores that would germinate under the normal conditions of the control. The percent germination is expressed by the following equation: Observed percent germination×100÷percent germination in the control. The glass slide germination test by the test tube dilution method is adapted from a procedure recommended by the American Phytopathological Society's committee on standardization of fungicidal tests. (Phytopathology, 37, 354–356 (1947).) In such tests, compounds of this invention gave the following results.

| Compound | Concentration, p.p.m. for LD$_{50}$ Against Fungus | |
|---|---|---|
|  | A.o. | S.f. |
| 2,4-Dinitro-1-chloronaphthalene | 0.5 | 0.5 |
| Nitrodichloronaphthalene of Example II |  | 5 |
| Nitrochloronaphthalene of Example I | 5 | 5 |

Furthermore, against the tomato foliage disease commonly referred to as late blight, our compounds are outstanding. For example, 2,4-dinitro-1-chloronaphthalene was found to have an ED$_{95}$ of only 16 p.p.m. against late blight in the following test:

*Tomato foliage disease test.*—The tomato foliage disease test measures the percent control of late blight fungus, *Phytophthora infestans*. As the first step the fungicides are evaluated at concentrations of 2000 and 400 p.p.m. Tomato plants are sprayed with the fungicide formulation, allowed to dry, and along with untreated controls are sprayed with a spore suspension of sporangia of *Phytophthora infestans*. The plants are held in a saturated atmosphere for 24 hours at 60° F. to permit spore germination and infection before removal to the greenhourse. After 2 to 4 days lesion counts are made on the three uppermost fully expanded leaves. Compounds giving 85 percent disease control or better against one or both disease-causing organisms at 400 p.p.m. are entered into further screening at dosages of 400, 80, and 16 p.p.m. This test method is a modification of that described by McCallan and Wellman (Contrib. Boyce Thompson, 13 (3): 93–134. July-September 1943).

We claim:

1. A fungicidal composition comprising a halonitronaphthalene of the formula

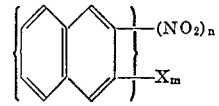

wherein *n* is one of the integers 1 and 2, *m* is one of the integers 1 and 2, the total of *n* and *m* is not over three and X is a halogen of atomic number 17–35, together with a surface active agent as a dispersant therefor.

2. A fungicidal composition comprising 2,4-dinitro-1-chloronaphthalene and a surface active agent as a dispersant therefor.

3. A wettable powder fungicidal composition comprising the composition of claim 1 and a finely divided solid powder as a carrier therefor.

4. A wettable powder fungicidal composition comprising 2,4-dinitro-1-chloronaphthalene, a surface active agent and a solid dispersant as a carrier therefor.

5. Method of combating fungi, comprising applying a halonitronaphthalene of the formula

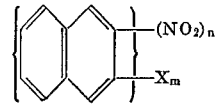

wherein *n* is one of the integers 1 and 2, *m* is one of the integers 1 and 2, the total of *n* and *m* is not over three and X is a halogen of atomic number 17–35, to the habitat of the fungi in a composition wherein said halonitronaphthalene is extended with a surface active agent in a dispersant as a carrier therefor.

References Cited in the file of this patent

UNITED STATES PATENTS 2,519,317    Kolka et al. _____ Aug. 15, 1950

OTHER REFERENCES

Chem. Abstracts, vol. 3, page 435, February 1909.
Frear: "Chem. of Insecticides, Fungicides, Herbicides," 2nd ed., pp. 4–6 and 280–288.